July 4, 1939.  J. P. ROGERS  2,164,545
AIRPLANE
Filed Nov. 13, 1937   2 Sheets-Sheet 1
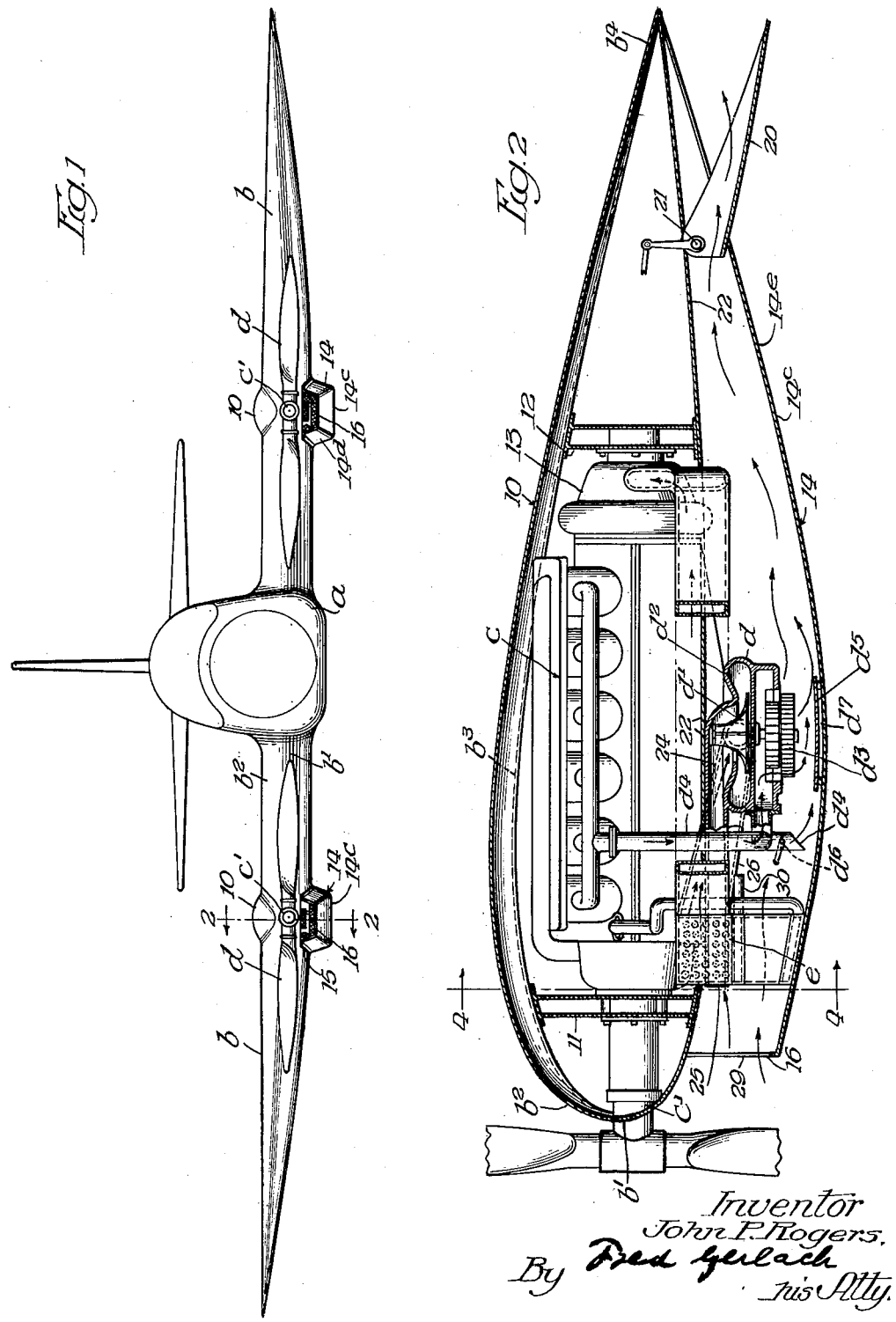

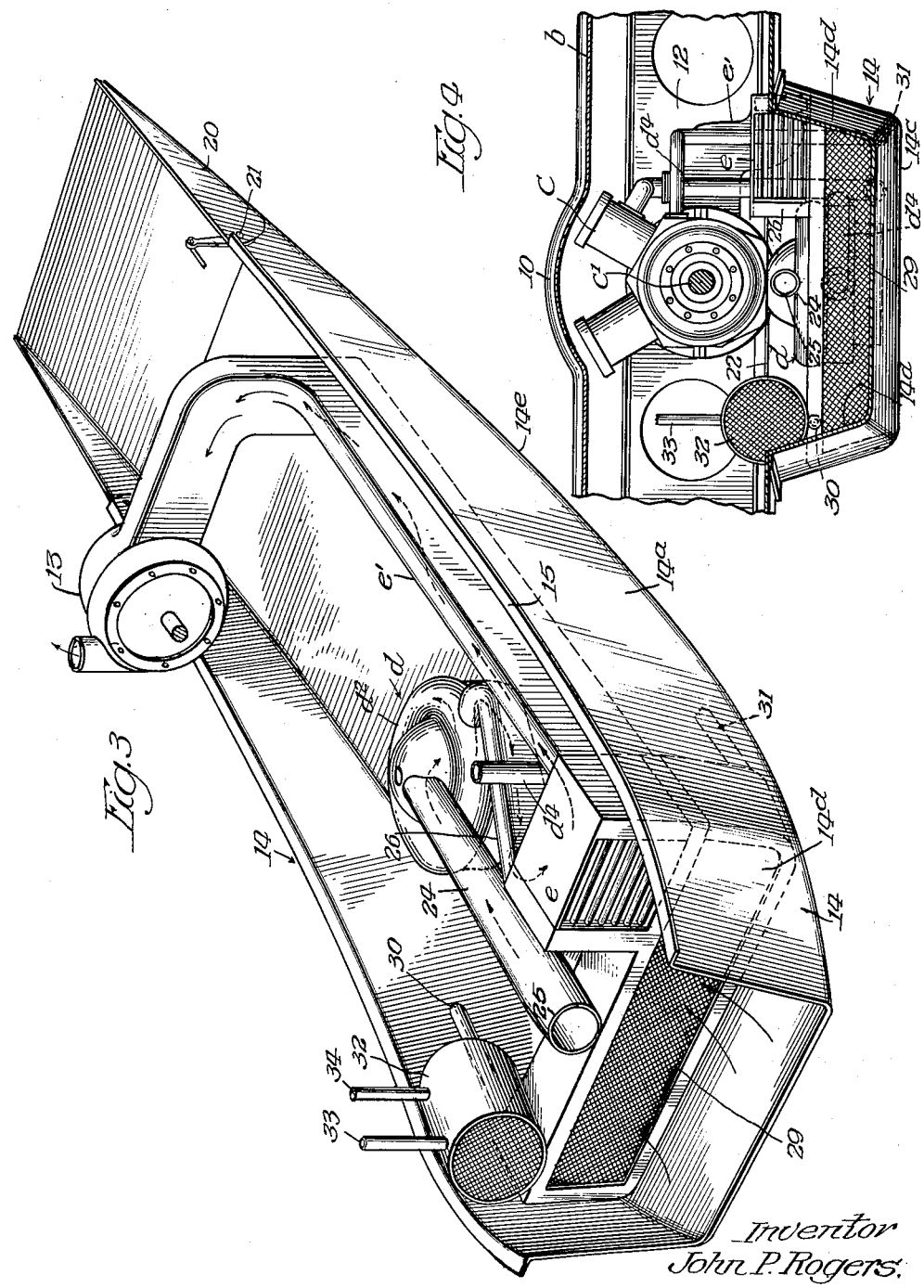

Patented July 4, 1939

2,164,545

UNITED STATES PATENT OFFICE 2,164,545

AIRPLANE

John P. Rogers, Williamsport, Pa., assignor to Aviation Manufacturing Corporation, Williamsport, Pa., a corporation of Delaware Application November 13, 1937, Serial No. 174,411

14 Claims. (Cl. 244—57)

The invention relates to airplanes and particularly to the arrangement of the engine and its associated equipment and to the problem of reducing the head-resistance of the airplane and improving the propulsive effort of the assembly.

One object of the invention is to place an exhaust-driven turbine for operating auxiliary equipment in a tunnel where the heat dissipated will be utilized to assist the propulsive effort of the power plant.

In airplanes equipped with liquid-cooled engines, a desideratum is to reduce the head-resistance of the radiators and other heat exchanging means employed in reducing the temperature of the coolant, the lubricating oil and the air for supercharging, and another object of the invention is to provide improved means for that purpose.

Another object of the invention is to provide a turbo-compressor to augment the supercharger on the engine for improving its performance to meet the requirements of high altitude airplanes.

Another object of the invention is to provide a turbo-compressor for augmenting the supercharger, which is disposed in a tunnel or cowl into which the air-stream enters, and which functions as a heat-engine. The kinetic energy of the air admitted to the cowl is transformed to pressure energy in the cowl and re-transformed at the exit of the tunnel into kinetic energy.

Another object of the invention is to decrease the frontal resistance of the heat rejecting equipment associated with the engine and their connections by including them in a tunnel or tunnel-shaped cowl.

A further object of the invention is to provide an arrangement for a turbo-compressor and its associated intercooler whereby the waste heat from these units is utilized for propulsion and their functions are more efficiently performed.

Other objects of the invention will appear from a consideration of the following detailed description.

The invention consists in the several novel features which are hereinafter set forth and are more particularly defined by claims at the conclusion hereof.

In the drawings: Fig. 1 is a front elevation of an airplane embodying the invention. Fig. 2 is a section on the line 2—2 of Fig. 1. Fig. 3 is a perspective of the cowl forming the tunnel in which the turbo-compressor and radiators are disposed. Fig. 4 is a section on the line 4—4 of Fig. 2.

The invention is exemplified as applied to an airplane comprising a fuselage $a$, a pair of main supporting-wings $b$, a power-plant in each of the wings, propellers $d$, and an empennage of any suitable construction.

Each power-plant comprises an internal combustion engine $c$ with a crankshaft $c'$ to which a propeller $d$ is connected. A nacelle cowling 10, conforming at its edges to the contours of the wing $b$, is provided to accommodate the cylinder-heads and valve-gear of each engine which is supported in any suitable manner between the front and rear wing-spars 11 and 12. The engine is of the liquid-cooled type and is provided at its rear end with a supercharger 13 for delivering air under pressure to the fuel-charge forming means of the engine, as well understood in the art.

The wing has an airfoil cross-section and comprises a pressure-face $b'$, a leading edge $b^2$, a camber-face $b^3$, and a trailing edge $b^4$. A cowl 14 located in the propeller slip stream extends under and chord-wise of each wing below the engine $c$, and the upper margins 15 of its sides 14$^a$ conform and are joined to the under-side or pressure face of the wing to form an air-tunnel under the wing and power-plant for the heat-transfer and cooling equipment of the engine and a turbo-compressor. At its front end the cowl has an opening 16 which serves as an inlet for the air-stream. The cowl 14 comprises a bottom 14$^c$ and sides 14$^a$. The front portions 14$^d$ of the sides 14$^a$ are rearwardly divergent from the inlet opening 16. The bottom 14$^c$ of the cowl is rearwardly convergent with respect to the pressure-face $b'$ of the wing. This construction forms the tunnel so that it will have a progressively increasing area from inlet opening 16 to a point of greatest area approximately under the maximum thickness of the wing. From this point of greatest area the bottom 14$^c$ converges as at 14$^e$ to the trailing edge $b^4$ of the wing. A sheet 22 closes the top of the tunnel to prevent the air from entering the chamber in the wing-structure adjacent the engine. This cowl is of substantially streamline contour and provides a tunnel on the bottom of the wing and under the engine, with a restricted inlet 16 through which the air-stream enters the tunnel. Because the tunnel has a rearwardly increasing cross-sectional area the air entering the tunnel via the restricted inlet expands with a consequent reduction in velocity. Because of the resistance to the air and the acquisition of heat there is a resultant increase in the pressure of the air. Since the resistance to the flow of air past or through an object is in general proportional to the square of the air velocity, the reduced velocity results in a consequent reduction in air resistance to the units enclosed within the tunnel.

An exit-flap 20 is provided in the rear of the cowl to control the flow of air through the tunnel and thereby control the cooling effect of the radiators within the duct. Flaps 20 are pivoted at 21 and connected for operation automatically or by the pilot in any suitable manner.

A turbo-compressor $d$ is disposed approximately in the portion of the tunnel having the greatest cross-sectional area. This compressor comprises a casing $d^2$ containing an impeller $d'$, a turbine-wheel $d^3$ which is fixed to the shaft of the impeller so that the impeller will be operated by the turbine-wheel. A pipe $d^4$ is connected to conduct exhaust gases from the exhaust manifold of the engine to the casing $d^2$ to drive the turbine-wheel $d^3$. The exhaust gases are discharged downwardly into the tunnel. A shield $d^5$ separated by an air-space $d^7$ is provided to prevent these gases from striking the cowling directly. A throttle $d^6$ is provided in a branch of pipe $d^4$ to by-pass more or less of the exhaust gases directly into the tunnel, and thereby control the operation of the turbine-wheel $d^3$. Air is supplied to the impeller-casing $d^2$ by an inlet duct 24 which has its rear end connected to the air inlet of the impeller-casing and is provided at its front end with an opening 25 which has its front end located substantially at the faces of the radiators to cause a portion of the air-stream to pass directly to the impeller. The increase in the pressure of the air by the turbo-compressor increases the temperature of the air and an intercooling radiator is provided to reduce the temperature of the air before it is delivered to the supercharger. The discharge outlet of the impeller-casing $d^2$ is connected by a pipe 26 to the intercooling radiator $e$ for reducing the temperature of the compressed air from the compressor. An outlet pipe $e'$ conducts air delivered by the compressor from radiator $e$ to the inlet of the supercharger 13. When the engine operates or the airplane is in motion, a portion of the air-stream entering the cowl will pass into opening 25 and through duct 24 to the compressor which will force air under pressure through pipe 26, radiator $e$ and pipe $e'$ to the inlet of the supercharger so that the turbo-compressor will augment the delivery of air to the supercharger for delivery to the charge-forming means of the engine. The intercooling radiator $e$ is disposed in the tunnel in the cowl and forwardly of the compressor in the cooler portion of the air-stream in the tunnel.

The engine is of the liquid-cooled type and the radiator 29 for cooling the water or other coolant is disposed forwardly of the compressor and is connected by pipes 30 and 31 to the engine. A cooler 32 for the lubricating oil used in the engine is also disposed in the tunnel forwardly of the compressor and is connected by pipes 33 and 34 to the usual pressure lubricating system of the engine.

When the engine operates or the airplane is in motion, the air entering the restricted inlet 16 at the front of the tunnel expands, on account of the greater area of the tunnel rearwardly of the inlet. Its cooling effect is then utilized on the intercooling radiator $e$, coolant radiator 29 and oil-cooler 32 and the turbo-compressor. As the air passes the turbo-compressor hot exhaust gas is intimately mixed therewith still further augmenting the temperature. The heat absorbed by the air from these elements increases the energy content of the air admitted to the tunnel.

The invention exemplifies an airplane with power plants in its wings and with a streamline cowl under each wing containing a turbo-compressor for augmenting the supply of air to the supercharger of the engine. It also exemplifies a cowl which surrounds an air cooler, a cooler for the engine coolant and a cooler for the oil used in the engine; and has a restricted inlet at its front for reducing the head-resistance of the power plant equipment. It also exemplifies a cowl which forms a tunnel under the power-plant for the heat interchanging accessories by which the kinetic energy of the air admitted to the cowl is increased by the addition of heat in the cowl and re-transformed at the exit of the tunnel into kinetic energy. It also exemplifies an airplane equipped with a power-plant and accessories which improve its performance to meet the requirements of high-speed and high altitude flight.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an airplane, the combination of a supporting structure, an internal combustion engine carried by the structure, a cowl forming a tunnel extending in a fore and aft direction of the airstream of the moving airplane and having an inlet opening at its front end and an outlet opening at its rear end for the passage of air therethrough, an engine accessory disposed in the tunnel, and a turbine driven by the engine exhaust gases and disposed in the tunnel for operating the accessory.

2. In an airplane, the combination of a supporting structure, an internal combustion engine carried by the structure, a streamlined cowl forming a tunnel extending in a fore and aft direction of the airstream of the moving airplane and having the central portion thereof of greater cross-sectional area than its ends, and provided with an inlet opening at its front end having an outlet opening at the rear end thereof for the passage of air therethrough, and a turbine disposed in said central portion of the tunnel, and driven by the exhaust of the engine.

3. In an airplane, the combination of a supporting structure, an internal combustion engine carried by the structure, a cowl forming a tunnel extending in a fore and aft direction of the airstream of the moving airplane and provided with an inlet opening at its front end and an outlet opening at the rear end thereof for the passage of air therethrough, a turbo-compressor disposed in the tunnel and having the turbine part thereof connected for drive by the exhaust gases of the engine, an intercooling radiator disposed in the tunnel forwardly of the compressor, and means for conducting fluid from the compressor to the radiator and thence to the engine.

4. In an airplane, the combination of a supporting structure, an internal combustion engine carried by the structure, a streamlined cowl forming a tunnel extending in a fore and aft direction of the airstream of the moving airplane, and provided with an inlet opening at its front end and a controllable outlet at its rear end whereby air is permitted to pass therethrough, a turbo-compressor disposed in the tunnel, and having the turbine part thereof connected for drive by the exhaust gases of the engine, an intercooling radiator disposed in the tunnel forwardly of the compressor, and means for conducting fluid from the compressor to the radiator and thence to the engine.

5. In an airplane, the combination of a supporting structure, an internal combustion engine carried by the structure and provided with a supercharger, a cowl forming a tunnel under the engine extending in a fore and aft direction of the airstream of the moving airplane, and having an inlet opening at its front end and an outlet opening at the rear end thereof for the passage of air therethrough, a turbo-compressor disposed in the tunnel and having the turbine part thereof driven by the exhaust gases of the engine, an intercooler disposed in the tunnel in front of the turbo-compressor, and means for conducting fluid from the compressor to the intercooler and thence to the supercharger.

6. In an airplane, the combination of a supporting structure, an internal combustion engine carried by the structure and provided with a supercharger, a cowl forming a tunnel under the engine extending in a fore and aft direction of the airstream of the moving airplane and having an inlet opening at its front end and an outlet opening at the rear end thereof for the passage of air therethrough, a turbo-compressor disposed in the tunnel and having the turbine part thereof connected for drive by the exhaust gases of the engine and provided with an exhaust opening into the tunnel, an intercooler disposed in the tunnel in front of the turbo-compressor, and means for conducting fluid from the compressor to the intercooler and thence to the supercharger.

7. In an airplane, the combination of a wing, an internal combustion engine mounted in the wing, a cowl under the engine forming a tunnel extending chord-wise of the wing and having an inlet opening at its front end and an outlet opening at the rear end thereof for the passage of air therethrough and also having a bottom lift surface substantially conforming in contour to the bottom lift surface of the wing, and engine accessories including a heat transfer unit mounted in the tunnel.

8. In an airplane comprising a wing, an internal combustion engine mounted in the wing, a cowl under the engine and forming a tunnel extending chord-wise of the wing, having an inlet opening at its front end and an outlet opening at its rear end for the passage of air therethrough and also having a bottom lift surface substantially conforming in contour to the bottom lift surface of the wing, a turbo-compressor disposed in the tunnel and having the turbine part thereof connected for drive by the exhaust gases of the engine, an intercooling radiator disposed in the tunnel in front of the compressor, and means for conducting fluid from the compressor to the radiator and thence to the engine.

9. In an airplane, the combination of a wing, an internal combustion engine mounted in the wing, a cowl under the engine forming a streamlined tunnel extending chord-wise of the wing and having the central portion thereof of greater cross-sectional area than its ends, and provided with an inlet opening at its front end and adjacent the leading edge of the wing and an outlet adjacent the trailing edge of the wing, a turbo-compressor disposed in the central portion of the tunnel and having the turbine part thereof connected for drive by the exhaust gases of the engine, an intercooling radiator disposed in the tunnel in front of the turbo-compressor, and means for conducting fluid from the compressor to the radiator and thence to the engine.

10. In an airplane, the combination of a supporting structure, an internal combustion engine supported by the structure, a streamlined cowl forming a tunnel extending in a fore and aft direction of the air-stream of the moving airplane, and having an inlet opening at its front, its front portion rearwardly divergent, its rear portion rearwardly convergent and provided with an outlet, a turbo-compressor in the tunnel adjacent the point of its greater area and connected for drive by the exhaust gases of the engine, and a radiator for the fluid in transit from the compressor to the engine disposed in the tunnel and forwardly of the compressor.

11. In an airplane, the combination of a supporting structure, an internal combustion engine supported by the structure, a cowl forming a tunnel extending in a fore and aft direction of the air-stream of the moving airplane, and having an inlet opening at its front and a controllable outlet at its rear whereby air is permitted to pass therethrough, a radiator for coolant for the engine disposed in and extending transversely of the tunnel, a turbo-compressor disposed in the tunnel behind the radiator and having the turbine part thereof connected for drive by the exhaust gases of the engine, and an intercooling radiator disposed in the tunnel adjacent the first mentioned radiator and connected to receive fluid from the compressor and to deliver it to the engine.

12. In an airplane, the combination of a supporting structure, an internal combustion engine supported by the structure, a cowl forming a tunnel extending in a fore and aft direction of the airstream of the moving airplane, and having an inlet opening at its front and a controllable outlet at its rear whereby air is permitted to pass therethrough, a radiator for coolant for the engine disposed adjacent the front of the tunnel, an oil cooler in the tunnel adjacent said radiator, a turbo-compressor disposed in the tunnel, and an intercooling radiator in the tunnel disposed forwardly of the compressor and connected to receive fluid from the compressor and to deliver it to the engine.

13. In an airplane, the combination of a supporting structure, an internal combustion engine supported by the structure, a cowl forming a tunnel extending in a fore and aft direction of the air-stream of the moving airplane, and having an inlet opening at its front and a controllable outlet at its rear, a radiator for coolant for the engine in the tunnel, a turbo-compressor disposed in the tunnel and having the turbine part thereof connected to be driven by the exhaust gases of the engine, and an intercooling radiator in the tunnel connected to receive fluid from the compressor and to deliver it to the engine, the cowl having its front portion rearwardly divergent and its rear portion rearwardly convergent, the compressor being disposed in the portion of the tunnel having substantially the greatest area, the radiators being disposed forwardly of the compressor.

14. In an airplane, the combination of a supporting structure, an internal combustion engine supported by the structure, a streamlined cowl forming a tunnel extending in a fore and aft direction of the air-stream of the moving airplane, and having an inlet opening at its front and a controllable outlet at its rear, a radiator for coolant for the engine disposed in the tunnel, an oil cooler in the tunnel, a turbo-compressor disposed in the tunnel, and an intercooling radiator in the tunnel connected to receive fluid from the compressor and to deliver it to the engine, the cowl having its front portion rearwardly divergent and its rear portion rearwardly convergent, the compressor being disposed in the portion of the tunnel having substantially the greatest area, the radiators and cooler being disposed forwardly of the compressor.

JOHN P. ROGERS.